(12) United States Patent
Johnson

(10) Patent No.: US 9,678,575 B2
(45) Date of Patent: Jun. 13, 2017

(54) FLEXIBLY-MOUNTED EVACUATION CHANNELS IN COLLAPSIBLE BAGS

(71) Applicant: LIQUI-BOX CORPORATION, Richmond, VA (US)

(72) Inventor: James W. Johnson, Delaware, OH (US)

(73) Assignee: LIQUI-BOX CORPORATION, Richmond, VA (US)

( * ) Notice: Subject to any disclaimer, the term of this patent is extended or adjusted under 35 U.S.C. 154(b) by 0 days.

(21) Appl. No.: 14/279,478

(22) Filed: May 16, 2014

(65) Prior Publication Data
US 2014/0339270 A1    Nov. 20, 2014

Related U.S. Application Data

(60) Provisional application No. 61/824,884, filed on May 17, 2013.

(51) Int. Cl.
| | | |
|---|---|---|
| *B67D 7/78* | (2010.01) | |
| *G06F 3/01* | (2006.01) | |
| *G06F 3/03* | (2006.01) | |
| *G06K 9/00* | (2006.01) | |
| *B65D 75/58* | (2006.01) | |
| *B65D 77/06* | (2006.01) | |

(52) U.S. Cl.
CPC ......... *G06F 3/017* (2013.01); *B65D 75/5877* (2013.01); *B65D 77/06* (2013.01); *G06F 3/0304* (2013.01); *G06K 9/00335* (2013.01); *B65D 2231/004* (2013.01)

(58) Field of Classification Search
CPC .......................... B65D 77/065; B65D 75/5877
USPC .............................. 222/92, 105, 464.2, 464.3
See application file for complete search history.

(56) References Cited

U.S. PATENT DOCUMENTS

| | | | |
|---|---|---|---|
| 4,138,036 A | 2/1979 | Bond | |
| 4,286,636 A | 9/1981 | Credle | |
| 4,601,410 A | 7/1986 | Bond | |
| 4,913,316 A * | 4/1990 | Richter | ............................ 222/1 |
| 5,941,421 A | 8/1999 | Overman et al. | |
| 6,347,785 B1 | 2/2002 | Copp et al. | |
| 7,004,209 B2 | 2/2006 | Davis et al. | |
| 7,857,514 B2 * | 12/2010 | Gaikwad | ........................ 383/59 |
| 2003/0136798 A1 | 7/2003 | Wilford | |
| 2004/0123918 A1 | 7/2004 | Davis et al. | |

FOREIGN PATENT DOCUMENTS

| | | |
|---|---|---|
| JP | 2012-158343 A | 8/2012 |
| WO | WO 2008/073643 A1 | 6/2008 |

* cited by examiner

*Primary Examiner* — Patrick M Buechner
(74) *Attorney, Agent, or Firm* — Baker & Hostetler LLP

(57) ABSTRACT

The present invention relates to a mounting for connecting at least one peripherally-connected evacuation channel to the spout of a flexible bag and more particularly to a flexible mounting for connecting such at least one evacuation channel.

7 Claims, 6 Drawing Sheets

FLEXIBLY-MOUNTED EVACUATION CHANNELS IN COLLAPSIBLE BAGS

CROSS REFERENCE TO RELATED APPLICATIONS

This patent application claims priority to U.S. provisional patent application No. 61/824,884, filed on May 17, 2013. The entire content of the aforementioned applications is incorporated by reference herein for all purposes.

TECHNICAL FIELD

The present invention relates to a mounting for connecting at least one peripherally-connected evacuation channel to the spout of a flexible bag, and more particularly to a flexible mounting for connecting such at least one evacuation channel.

BACKGROUND

Flexible plastic bags have come to be widely used to distribute and dispense liquids such as wine and syrups for preparing drinks. Such bags typically have a thin, flexible plastic wall having a dispensing spout or fitment sealed to the wall of the bag. In use, the flexible bag is filled with a flowable material to be dispensed, and the bag is packed in a relatively rigid container, e.g., a corrugated cardboard box, for distribution. At the point of use, the spout is extended through a hole in the side of the rigid container and a dispensing tap or service line connector is fitted thereto to control and direct the dispensing of the contents of the bag. Because the walls of the bag are thin and very flexible, the bag collapses as the contents are removed. As the liquid contents of the bag are dispensed, it is possible that one of the flexible bag walls may be drawn close to the spout, even when a substantial proportion of the contents remain in the bag, and may come to cover the inner end of the spout, thus blocking it and shutting off flow. Because of the pressure of the remaining liquid in the bag on the wall, it is difficult and troublesome to dislodge the wall from the spout and remove the blockage.

Accordingly, it has become customary to provide an evacuation channel or form within the flexible bag to prevent the thin wall from blocking the spout as the bag is emptied. One such example of an evacuation channel is disclosed in U.S. Pat. No. 4,138,036, to Curtis J. Bond (the "Bond patent"), the entire disclosure of which is incorporated herein by reference. The Bond patent discloses a helical channel or tube that is mounted in the spout and extends into the interior of the flexible bag. As described therein, the bag collapses around the evacuation channel. Accordingly, the wall of the bag cannot block the spout. Furthermore the evacuation channel provides a path for the contents to reach the spout even when the walls of the bag have collapsed around it, thereby assuring substantially complete drainage of the contents of the bag.

However, although the helical evacuation channel disclosed in the Bond patent is very effective, it is not well adapted to the more modern practice of forming flexible bags from a pair of walls made from a flexible plastic film and sealed together around their edges. Such bags are convenient because they are relatively flat in the unfilled condition, and, accordingly, are convenient to store and to ship to a location where they are to be filled. Because of the way in which the evacuation channel of the Bond patent is mounted, it extends some distance into the bag from the inner end of the spout. This prevents the bag from assuming the desirable flattened configuration. Furthermore, because of the mounting of the helical channel of the Bond patent, it is inserted into the bag after it is formed, which necessitates an extra manufacturing step.

Furthermore, the mounting of the helical channel disclosed in the Bond patent is not well adapted to use with collapsible bags for use with service line connectors that are provided with quick-disconnect fittings and valves. Such quick-disconnect fittings and valves may use a valve element that slides within the fitment or spout, projecting into the bag when actuated by the insertion of a service line connector and being withdrawn within the fitment to cut off the flow of contents when the connector is withdrawn. Because of possible interference between the slider of such a valve and an evacuation channel attached to the spout it has not been possible to mount an evacuation channel, and particularly a desirable helical evacuation channel, to the periphery of the spout as with the mounting arrangement of the Bond patent.

The evacuation problem becomes even more complicated when the fluids to be evacuated constitute viscous materials such as pastes, puree, sauces, slurries, cheeses, oil-based products, etc. Even with an evacuation channel described in the Bond patent, which helps to keep the spout open from one of the bag walls collapsing and shutting, a substantial amount of the fluid may remain in the bag, unevacuated, if the fluid is viscous and not easily flowable. Particularly, when a collapsible bag being evacuated is placed in a tray with its spout connected to fitment for dispensation purposes, the tray may be placed at an angle to help the flow of the fluid being evacuated. This may result in a low lying region within the bag that is proximate to the spout attached to the bag and that which is at the bottom of the tray. This low lying region acts as a reservoir of fluid that remains unevacuated and thus wasted, even with a helical channel disclosed in the Bond patent. This problem is clearly exacerbated when thicker fluids, more viscous fluids, are to be evacuated due to their natural tendency to resist flowability.

Accordingly, a need has continued to exist for a mounting that can address the evacuation problem, and especially the evacuation problem when viscous fluids are used.

SUMMARY

This need has now been addressed by the mounting of the present invention. This invention relates to a flexible mounting for securing at least one evacuation member to a fitment for use in a collapsible bag said mounting comprising: a peripheral ring adapted to fit within a spout of said fitment; at least one flexible leg attached to the peripheral ring to which is attached said at least one evacuation member that permits said at least one evacuation member to be displaced relative to said peripheral ring to allow accommodation of any service line connector to which said fitment is secured without interfering with the operation of said at least one evacuation member and said at least one evacuation member can be as flat as possible within the bag upon manufacture.

The present invention provides a flexible mounting for securing at least one an evacuation member to a fitment for use in a collapsible bag. The flexible mounting comprises a peripheral ring adapted to fit within a spout of the fitment. At least one flexible leg is attached on one of its end to the peripheral ring and attached to one of said at least one evacuation member on its other end.

According to the invention the mounting for said at least one evacuation channel comprises the peripheral ring that is sized to fit snugly at the inner end of a spout of a collapsible bag. In one embodiment, the mounting comprises a plurality of evacuation channels connected to the peripheral ring with each evacuation channel connected to the peripheral ring by means of two or more flexible legs.

The present invention further provides a mounting means for attaching said at least one evacuation channel to the peripheral ring that fits snugly within the spout of a collapsible bag.

The present invention further provides a flexible mounting for attaching said at least one evacuation channel to the spout of a collapsible bag.

The present invention further provides at least one evacuation channel having an open helical wall flexibly mounted to the spout of a collapsible bag.

The present invention further provides a flexible mounting for said at least one evacuation channel that can be employed with a plurality of different service line connectors.

The present invention further provides a flexible mounting for said at least one evacuation channel that can be installed in a spout of a collapsible bag before the bag is formed by peripheral sealing of opposed walls or panels.

The present invention further provides a flexible mounting for fastening said at least one evacuation channel to the spout of a collapsible bag without using a heat sealing step.

Finally the flexible mounting of the invention ensures that the bag does not collapse about the spout such that evacuation is blocked.

Further aspects of the invention will become apparent from the description of the invention which follows.

BRIEF DESCRIPTION OF THE DRAWINGS

FIG. 1 (B) illustrates the perspective view of FIG. 1 wherein the evacuation channels comprise tubular netting.

DETAILED DESCRIPTION OF ILLUSTRATIVE EMBODIMENTS

Figure 1:
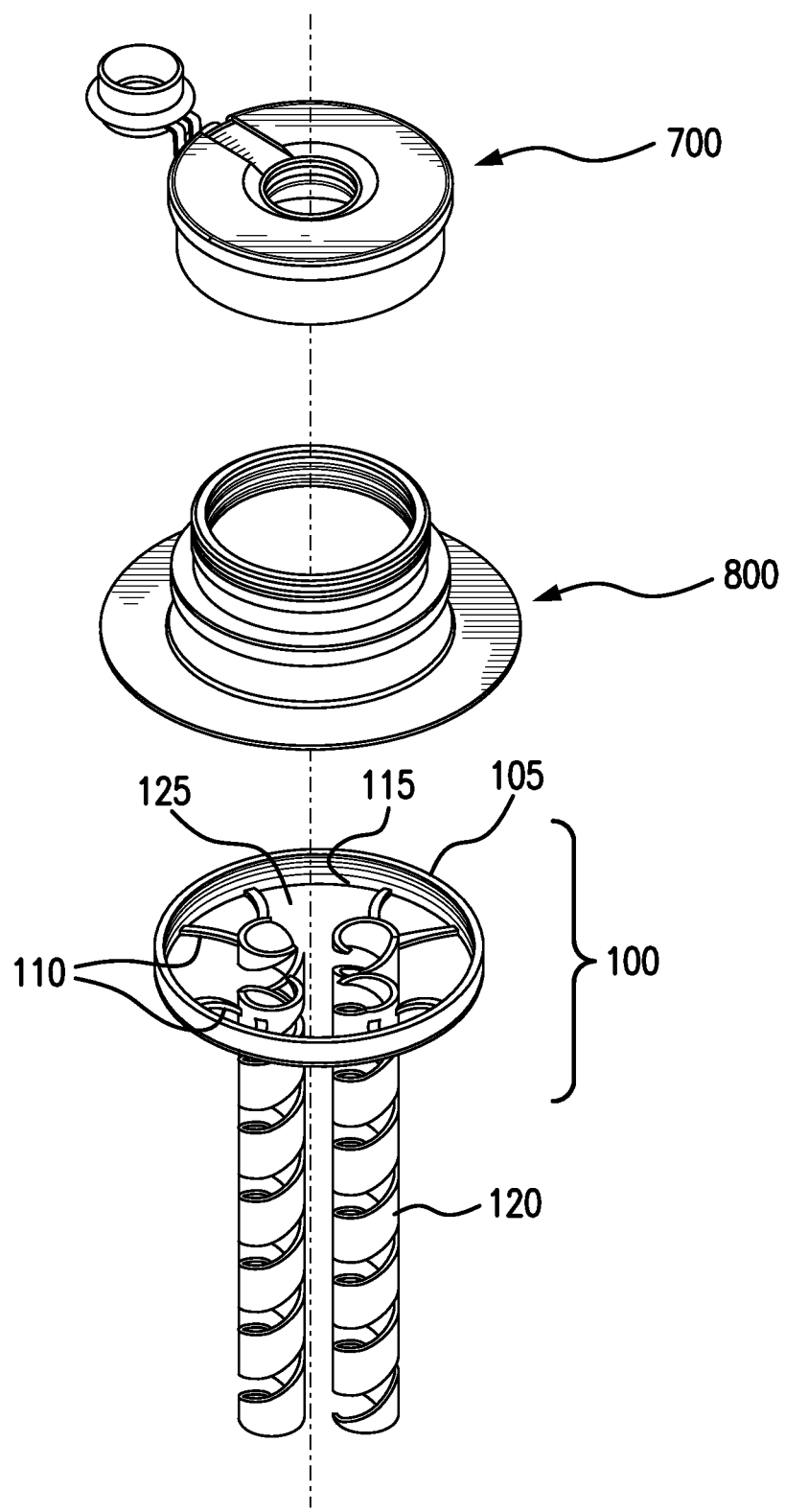
FIG. 1 illustrates a perspective view of the flexible mount of the invention with four helical evacuation channels attached to the ring thereto.
Figure 1B:
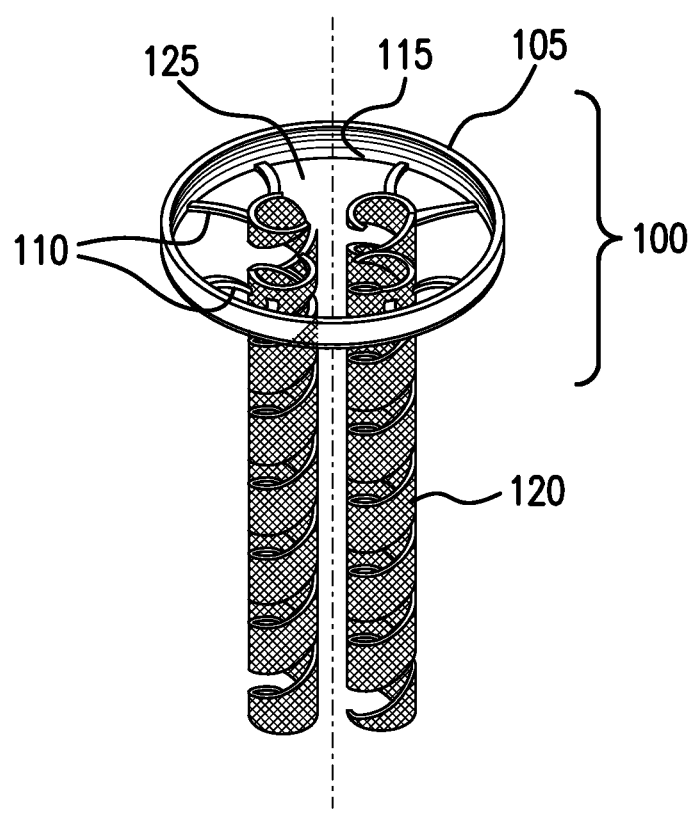

Ranges are used herein in shorthand, so as to avoid having to list and describe each and every value within the range. Any appropriate value within the range can be selected as the upper value, lower value, or the terminus of the range.

As used herein, the singular form of a word includes the plural, and vice versa, unless the context clearly dictates otherwise. Thus, the references "a," "an," and "the" are generally inclusive of the plurals of the respective terms. For example, reference to "a method' includes a plurality of such "methods." Likewise, the terms "include," "including," and "or" should all be construed to be inclusive, unless such a construction is clearly prohibited from the context. Similarly, the term "examples," particularly when followed by a listing of terms, is merely exemplary or illustrative and should not be deemed to be exclusive or comprehensive.

The term "comprising" is intended to include embodiments encompassed by the terms "consisting essentially of" and "consisting of" Similarly, the term "consisting essentially of" is intended to include embodiments encompassed by the term "consisting of."

The methods and compositions and other advances disclosed herein are not limited to particular equipment or processes described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

As used herein, the term "flowable material" encompasses materials that are flowable under gravity or may be pumped. Such materials include liquids, for example, milk, water, fruit juice, oil; emulsions, for example, ice cream mix, soft margarine; pastes, for example, meat pastes, peanut butter; preserves, for example, jams, pie fillings, marmalade; jellies; doughs; ground meat, for example, sausage meat; powders, for example, gelatin powders, detergents; granular solids, for example, nuts, sugar; and like materials. The invention described herein is particularly useful for flowable foods that are viscous and thick.

The present invention provides a flexible mounting (100) for securing at least one and preferably a plurality of evacuation members to a fitment for use in a collapsible bag. As shown in FIG. 1, the flexible mounting comprises a peripheral ring (105) adapted to fit with a spout (800) of the fitment having a cap (700), a plurality of flexible legs (110) attached along the inside rim (115) of the peripheral ring (105), and at least one evacuation channel (120), but preferably a plurality of evacuation channels, with each evacuation channel (120) attached to the peripheral ring (105) through one or more flexible legs (110), and preferably two flexible legs. Generally, the plurality of the evacuation channels is organized such that the central portion (125) of the peripheral ring remains empty.

In one embodiment, the flexible legs can engage the evacuation channels in a variety of angular configurations. Clearly, the angular configurations are useful in determining the level of strain on the evacuation channels when the bag is collapsing. In one embodiment, the flexibility of the legs is sufficient that it does not interfere with the collapsing of the bag. At the same time, in another embodiment, the flexibility of the legs allows for regaining their original configuration once the collapsing of the bag (to remove flowable material) is over. In one embodiment, the flexible legs can be only one in number, that is one leg attached to one evacuation channel, but its width is comparable to the diameter of the evacuation channel in case of the channel having an annular/helical structure. The width of the flexible legs can be from a thin strip (compared to the diameter of the evacuation channel) to a wide band (comparable or even wider than the diameter of the evacuation channel).

The advantages of an evacuation member or channel in a collapsible bag are achieved according to the invention by using a flexible mounting fitted to the inner end of the spout or fitment of the bag. Such a flexible mounting, in one embodiment, allows the helical channel to lie within the flat collapsed bag as manufactured and then to swing into the liquid contents of the bag after it is filled, with the plurality of evacuation channels extending generally peripherally from the spout. The advantages, operation, and construction of a helical channel are disclosed in the Bond patent and U.S. Pat. No. 7,004,209 to Davis, et al. (the "Davis patent"), the entire disclosures of which are incorporated herein by reference.

In one embodiment, the flexibly-mounted helical evacuation channel can also be used with fitments that incorporate a slide valve extending into the bag in its open position. Accordingly, the flexible mounting of the invention permits a single type of collapsible bag fitted with an evacuation channel to be used with several different types of service line connectors. Different types of service line connectors and their use with a single type of fitment and valve are disclosed in U.S. Pat. No. 6,347,785, to Copp, et al., the entire disclosure of which is incorporated herein by reference. A slide valve suitable for use with different types of service line connectors, some requiring a poppet valve and others a slide valve, is disclosed in U.S. patent application Ser. No. 10/076,572, filed Feb. 19, 2002, the entire disclosure of which is incorporated herein by reference.

Preferred embodiments of the invention are described with reference to the figures of the accompanying drawings.

FIG. 1 shows a perspective view of said flexible mounting (100) to which are attached four helical evacuation members (120). The mounting (100) comprises an outer or peripheral ring (105), a plurality of, in this example, four pairs, flexible legs (110) extending between inner rim (115) of the peripheral ring and the helical evacuation members (120).

In one embodiment, the plurality of evacuation member are helical channels, however, it will be understood by a person skilled in the art that the evacuation members may comprise any form that provides a channel for evacuation of the bag. For example, the evacuation members may comprise an elongated tube comprising a plurality of apertures or may comprise tubular netting, such as Vexar®, as shown in FIG. 1 (B). Other suitable configurations would be apparent to the person skilled in the art as long as they provide the required evacuation result. In one embodiment, of the plurality of evacuation members, at least one of the members is different from said other members.

Figure 4:
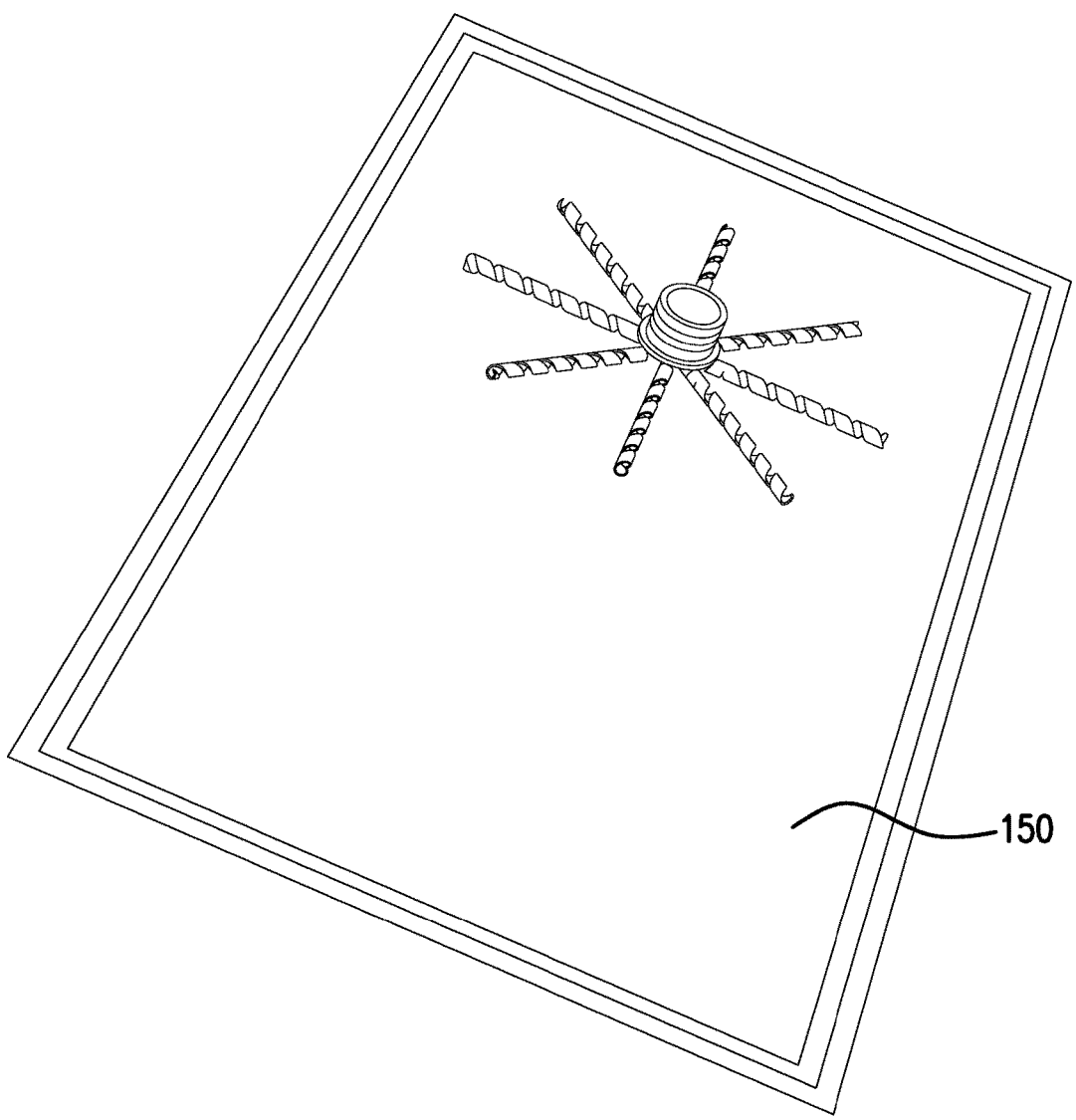
FIG. 4 shows a bag with a plurality of evacuation members such as helical channels attached to the peripheral ring, that are extended in a radial direction flexibly around the spout of the bag.

In one embodiment, the evacuation member (120) comprises a helical wall (126) surrounding a central channel (130). The helical wall (126) is effective in keeping the walls of a collapsible bag (see FIG. 4) from intruding into the central channel (130). Accordingly, an open channel is maintained through which the contents of the collapsible bag can flow to the spout (800) as the walls (150) of the bag collapse.

Figure 5:
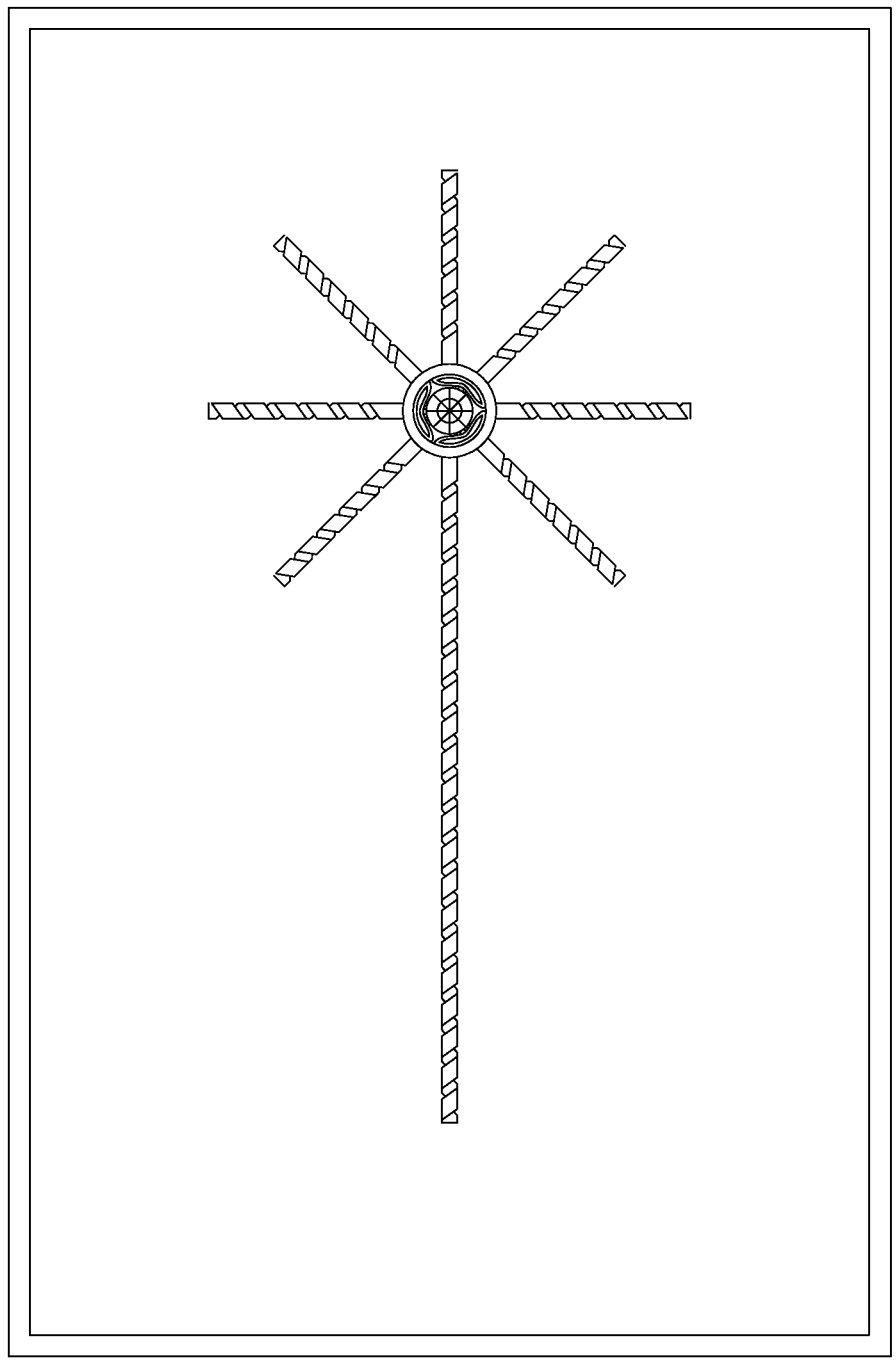
FIG. 5 shows a bag with a plurality of evacuation members such as helical channels attached to the peripheral ring, that are extended in a radial direction flexibly around the spout of the bag, as well as a central evacuation member (as described in the Davis patent) extending along the length of the bag.

In one embodiment, the flexible mounting (100) is positioned at the end of the spout (800) of the fitment, adjacent the collapsible bag. The peripheral ring (105) of the flexible mounting (100) is retained in an annular groove formed in the inner wall of the fitment (See the Davis patent, FIG. 5). The mounting may be retained in the fitment by any conventional means.

In one embodiment the mounting is retained in the fitment by an interference fit between the peripheral ring of the mounting and the annular groove of the fitment. However the mounting can also be retained in the fitment by a frictional fit, adhesive bonding, thermal welding, or the like.

Figure 2:
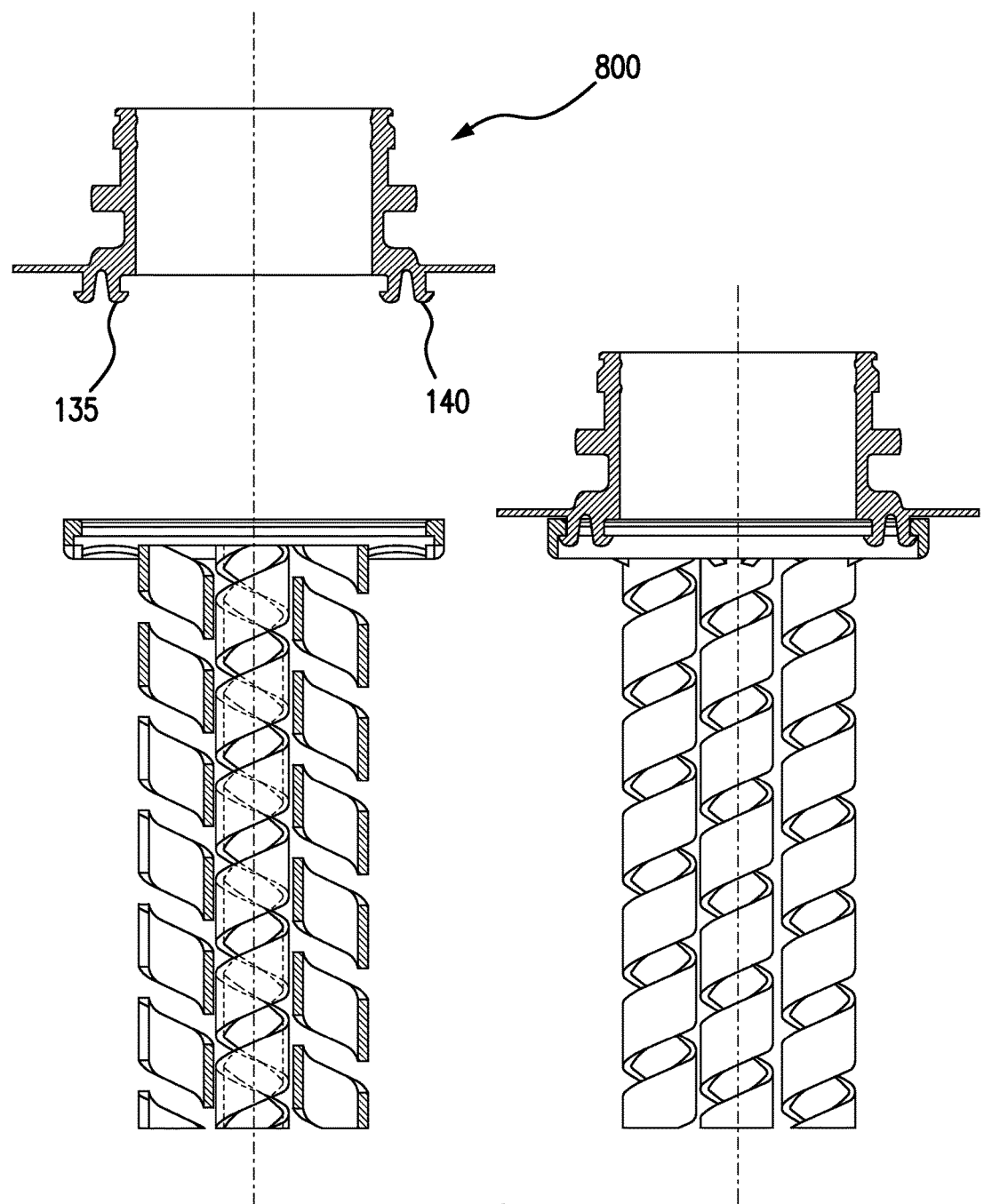
FIG. 2 is vertical cross section of the flexible mount of the invention as depicted in FIG. 1, with and without the attachment of the spout.

In one embodiment, the spout contains an inside flange (135) and an outside flange (140). The peripheral ring (105) has a receiving mechanism for the outside flange (105) fitting snugly with the ring (see FIG. 2).

Although the helical channels may extend straight along the axis of the fitment, it will be understood that the evacuation members are flexible and may bend to assume any position within the filled bag both when the bag is being shipped and as the contents of the bag are withdrawn at the point of use. When the filled bag is used with a service line connector that does not require the slider to be depressed into the container, i.e., a connector that opens a poppet valve at the inward end of the slider, as shown, for example, in U.S. Pat. No. 6,347,785, the slider remains in the position illustrated in FIG. 6 of the Davis patent, which is incorporated by reference herein, and the fluid material in the bag then flows through the open areas between the flexible legs and the central hole and thence out through the open poppet valve of the slider.

Although the flexible mount of the invention can be assembled from separate parts such as a peripheral ring, flexible legs, and evacuation members such as helical channels, it is preferably made by molding from any suitable synthetic resin having sufficient flexibility. Typical materials are polyethylene, polypropylene and the like. A preferred material is polyethylene. Furthermore, although the helical channel may be manufactured separately and welded or heat-sealed to the flexible legs, it is also according to the invention to form the helical channel integrally with the flexible mount, as by for example, molding.

Figure 3:
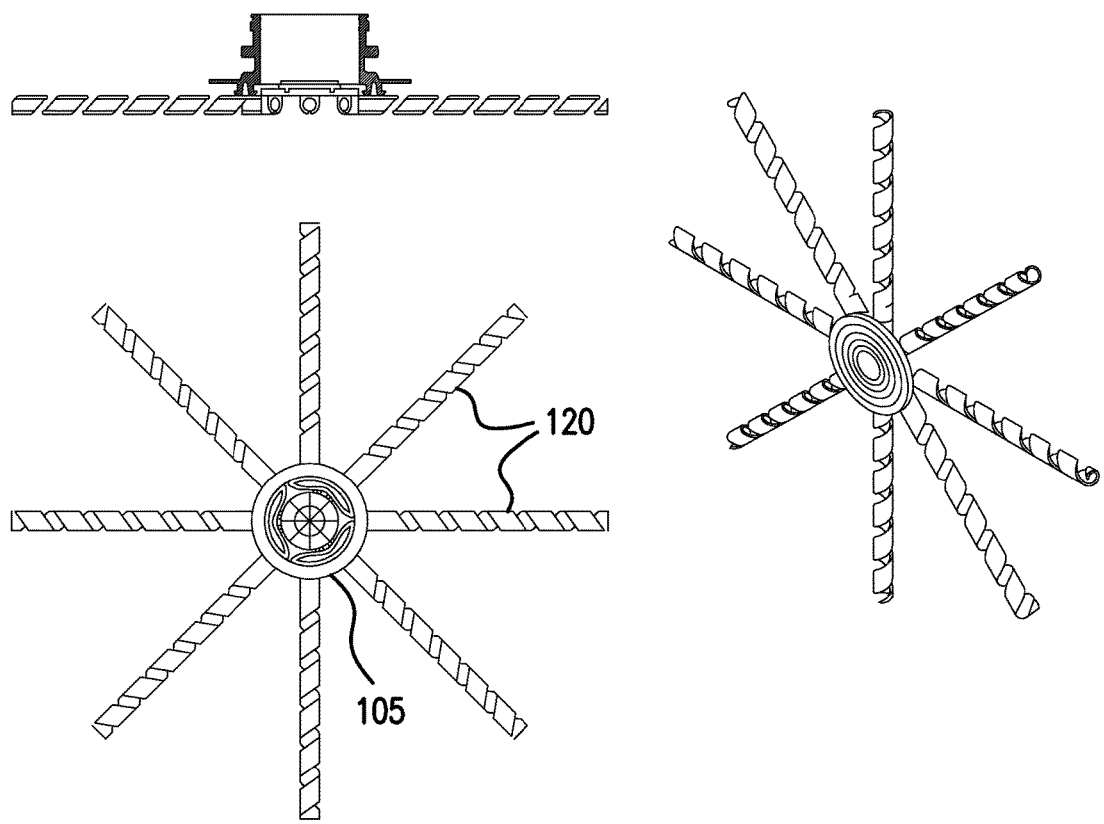
FIG. 3 shows the horizontally or planar oriented helical evacuation channels that have flexible springs in between the peripheral ring and the central disk.

In one embodiment of the invention, for example, as shown in FIG. 3, the evacuation members such as helical channels (120) are attached to the peripheral ring (105) such that the longitudinal axis of the at least one helical channel (120) extends in the same plane as the plane of the peripheral ring (105) but is oriented radially to the plane of the peripheral ring (105), without flexing of the flexible legs (110) or the flexible helical channels (120).

In another embodiment of the invention the evacuation members such as helical channels (120) are attached to the peripheral ring (105) such that the longitudinal axis of the at least one helical channel (120) is perpendicular to the plane of the peripheral ring (105; see for example, FIG. 1) without flexing the flexible legs (110) or the flexible helical channels (120).

In other embodiments, the evacuation members such as helical channels (120) are attached to the peripheral rings such that the longitudinal axes of the helical channels (120)

are disposed at angle to the plane of the peripheral ring or the spout, selected from 0 degree to about 180 degree.

In another embodiment, at least one evacuation member such as a helical channel is different in its angular disposition to the peripheral ring from other evacuation member or members. In one embodiment, the peripherally attached evacuation members to the peripheral ring range from 1-20 in number. In other words, the number of evacuation members attached to the peripheral ring can be 1, 2, 3, 4, 5, 6, 7, 8, 9, 10, 11, 12, 13, 14, 15, 16, 17, 18, 19, and 20.

In one embodiment, the evacuation members are symmetrically placed around the periphery. In another embodiment, at least one evacuation member such as a helical channel is of different length from other evacuation member or members.

In one embodiment, at least one evacuation member is attached to the peripheral ring such that the flexible mounting has a central disk to which a central evacuation member is secured, and a plurality of spring members extending between the peripheral ring and the central member are provided. This central evacuation member is described in detail in the Davis patent, which is incorporated by reference in its entirety herein. Except the central evacuation member, all concepts and parts such as helical evacuation channels peripherally attached to the ring, springs, central disk, and central member, are shown in FIG. 3. The central evacuation member is optional, in one embodiment. In other words, the present invention works with the flexible mounting for the evacuation channel described in the Davis patent, wherein additional evacuation members are attached to the ring of the flexible mounting of the Davis patent, but wherein the additional evacuation members are oriented at an angular disposition to the plane of the ring or the spout as previously described. In one embodiment, the number of additional evacuation members is 1, 2, 3, 4, 5, 6, 7, 8, 9, 10, 11, 12, 13, 14, 15, 16, 17, 18, 19, or 20.

All preferences expressed herein may be combined in any desired and suitable manner to create additional preferred combinations or embodiments of the invention and such combinations are all within the scope of the invention disclosed herein.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

What is claimed:

1. A flexible mounting for securing a plurality of flexible evacuation members to a fitment for use in a collapsible bag said mounting consisting of: a peripheral ring adapted to fit within a spout of said fitment; a plurality of flexible legs attached to the peripheral ring to which is attached said evacuation members for evacuation of said bag that permit said evacuation members to be displaced relative to said peripheral ring to allow accommodation of any service line connector to which said fitment is secured without interfering with the operation of said evacuation members and said evacuation members being as flat as possible within the bag upon manufacture and wherein said evacuation members are integrally formed with said flexible mounting and at least one of said evacuation members is a helical channel;
   wherein each of said evacuation members being individually adjustable to alternative positions where the longitudinal axis of the evacuation members is oriented radially (0 degree), perpendicularly (90 degree), or at an angle selected from the range of from about 0 degree to about 90 degree to the plane of the peripheral ring, without the flexing of the flexible legs or the evacuation members.

2. A method for removing flowable material from a collapsible bag, comprising attaching a flexible mounting as recited in claim 1 to said collapsible bag, and evacuating said collapsible bag.

3. A flexible mounting according to claim 1, wherein said at least one evacuation member is made from tubular netting.

4. A flexible mounting according to claim 1, wherein the number of said evacuation members are attached to said peripheral ring is selected from the range of from 2 to 20, and wherein said evacuation members are symmetrically or asymmetrically mounted to the peripheral ring.

5. A flexible mounting according to claim 4, wherein at least one of said plurality of evacuation members is of different length from the remaining evacuation members of said plurality of evacuation members.

6. A flexible mounting according to claim 5, wherein said at least one evacuation member is a tubular attachment portion located at one end thereof for snap fit connection to the central member.

7. A flexible mounting for securing a plurality of flexible helical evacuation members to a fitment for use in a collapsible bag said mounting consisting of: a peripheral ring adapted to fit within a spout of said fitment; a plurality of flexible legs attached to the peripheral ring to which is attached said evacuation members for evacuation of said bag that permit said helical evacuation members to be displaced relative to said peripheral ring to allow accommodation of any service line connector to which said fitment is secured without interfering with the operation of said helical evacuation members and said helical evacuation members being as flat as possible within the bag upon manufacture and wherein said evacuation members are integrally formed with said flexible mounting and at least one of said evacuation members is a helical channel;
   wherein each of said evacuation members being individually adjustable to alternative positions where the longitudinal axis of the evacuation members is oriented radially (0 degree), perpendicularly (90 degree), or at an angle selected from the range of from about 0 degree to about 90 degree to the plane of the peripheral ring, without the flexing of the flexible legs or the evacuation members and
   a central member to which a second evacuation member is secured; and a plurality of spring members extending between said peripheral ring and said central member, said spring members supporting said central member while permitting said central member to be displaced relative to said peripheral ring; wherein the plurality of spring members permits the displacement of the central member relative to said peripheral ring and wherein the spout having an internal passage that does not hinder insertion of couplings into the bag.

* * * * *